(12) United States Patent
Narasimhan et al.

(10) Patent No.: US 10,679,370 B2
(45) Date of Patent: Jun. 9, 2020

(54) ENERGY OPTIMIZED IMAGING SYSTEM WITH 360 DEGREE FIELD-OF-VIEW

(71) Applicant: CARNEGIE MELLON UNIVERSITY, Pittsburgh, PA (US)

(72) Inventors: Srinivasa Narasimhan, McDonald, PA (US); Herman Herman, Pittsburgh, PA (US); Jaime Bourne, Pittsburgh, PA (US); D. W. Wilson Hamilton, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 77 days.

(21) Appl. No.: 15/976,053

(22) Filed: May 10, 2018

(65) Prior Publication Data

US 2018/0374230 A1    Dec. 27, 2018

Related U.S. Application Data

(63) Continuation-in-part of application No. 15/545,391, filed as application No. PCT/US2016/017942 on Feb. 15, 2016, now Pat. No. 10,359,277.

(Continued)

(51) Int. Cl.
*G06T 7/586* (2017.01)
*G06T 7/521* (2017.01)
*G01B 11/25* (2006.01)
*H04N 13/254* (2018.01)

(Continued)

(52) U.S. Cl.
CPC .......... *G06T 7/586* (2017.01); *G01B 11/245* (2013.01); *G01B 11/2513* (2013.01);
(Continued)

(58) Field of Classification Search
CPC .. H04N 13/207; H04N 13/271; H04N 13/254; G06T 7/586; G06T 2207/10028; G06T 7/521; G01B 11/245; G01B 11/2518; G01B 11/2545; G01B 2210/52; G01B 2210/54; G01B 11/2513
See application file for complete search history.

(56) References Cited

U.S. PATENT DOCUMENTS

| 4,621,185 A * | 11/1986 | Brown | B23K 9/028 |
| | | | 219/124.22 |
| 2010/0074532 A1 * | 3/2010 | Gordon | G01B 11/25 |
| | | | 382/203 |

(Continued)

OTHER PUBLICATIONS

International Search Report and Written Opinion for International Application No. PCT/US2016/017942 dated May 19, 2016.
(Continued)

*Primary Examiner* — Yon J Couso (57) ABSTRACT

A system for creating a near-spherical point cloud of RGBD data includes one or more sensing units for providing depth data, each sensing unit having a stereo pair of sensors fitted with the wide-angle lens from which a one-dimensional line of pixels is read, and one or more lasers for illuminating the single line of pixels, the sensing units mounted on a spinning platform. The spinning platform is mounted on the base having a plurality of cameras mounted therein for providing 360-degree RGB data.

20 Claims, 10 Drawing Sheets

Related U.S. Application Data (60) Provisional application No. 62/176,352, filed on Feb. 13, 2015.

(51) Int. Cl.
  *H04N 13/207* (2018.01)
  *G01B 11/245* (2006.01)
  *H04N 13/271* (2018.01)

(52) U.S. Cl.
  CPC ...... *G01B 11/2518* (2013.01); *G01B 11/2545* (2013.01); *G06T 7/521* (2017.01); *H04N 13/207* (2018.05); *H04N 13/254* (2018.05); *H04N 13/271* (2018.05); *G01B 2210/52* (2013.01); *G01B 2210/54* (2013.01); *G06T 2207/10028* (2013.01)

(56) References Cited

U.S. PATENT DOCUMENTS

| | | |
|---|---|---|
| 2010/0128221 A1 | 5/2010 | Muller et al. |
| 2012/0200829 A1 | 8/2012 | Bronstein et al. |
| 2013/0021474 A1 | 1/2013 | Taylor et al. |
| 2013/0127854 A1 | 5/2013 | Shpunt et al. |
| 2014/0111616 A1 | 4/2014 | Blayvas |
| 2014/0247323 A1* | 9/2014 | Griffis ............... H04N 5/23238 348/36 |
| 2015/0294496 A1* | 10/2015 | Medasani ............ H04N 7/181 348/159 |
| 2018/0246189 A1* | 8/2018 | Smits .................. G01S 17/003 |
| 2019/0236796 A1* | 8/2019 | Blasco Claret ......... G06T 5/002 |

OTHER PUBLICATIONS

International Preliminary Report on Patentability for International Application No. PCT/US2016/017942 dated Aug. 15, 2017.

O'Toole et al., "3D Shape and Indirect Appearance by Structured Light Transport",University of Toronto, pp. 1-3, 6-7 (2014), (online) <URL: http://www.cs.toronto.edu/~kyros/pubs/14.cvpr.slt.pdf>.

O'Toole et al., "Prima-Dual Coding to Probe Light Transport." ACM, pp. 39:1-39:6 (2012), (online) <URL: http://www.cs.toronto.edu/~kyros/pubs/12.sig.pdc.pdf>.

* cited by examiner

ENERGY OPTIMIZED IMAGING SYSTEM WITH 360 DEGREE FIELD-OF-VIEW

RELATED APPLICATIONS

This application is a continuation-in-part of U.S. application Ser. No. 15/545,391, filed Jul. 21, 2017, which is a national phase filing under 35 U.S.C. § 371 of PCT Application No. PCT/US16/17942, filed Feb. 15, 2016, which claims the benefit of U.S. Provisional Patent Application No. 62/176,352, filed Feb. 13, 2015.

BACKGROUND OF THE INVENTION

When an image is captured under controlled lighting, the power of the light source has great impact on the result. All things being equal, brighter sources will send more photons to the sensor during an exposure, producing a brighter and less noisy image.

The brightness of the source, however, is just one way to control the amount of light that reaches the sensor of a computational imaging system. Modern systems use an arrangement of devices to transport light from a source to the scene (or from the scene to sensor) and these devices (galvanometers, digital micro-mirror devices, liquid-crystal panels, phase modulators, etc.) are often programmable. However, these devices in the currently used configurations are also inefficient in their power consumption.

Studies of this problem began in the 1960s for arrangements of just the three main active components; a light source, a controllable light-blocking mask, and a photo-sensor. In this ubiquitous configuration, the light source is always turned on, and, while the
energy efficiency of light sources has greatly increased over time, having the light source always turned on is still a major source of power consumption. The controllable light-blocking mask is used to selectively light the scene to be captured by the photo-sensor. This practice is not energy efficient, however, since photons that are being generated are simply blocked within the system.

SUMMARY OF THE INVENTION

This invention introduces an energy optimized imaging system that captures images using one or more directable beam light sources synchronized with one or more active pixel selectable photosensors.

By synchronizing control of both a light source having the ability to illuminate a specific area(s) along with a photo-sensor having a configurable mask having the ability to mask specific pixels, this invention can perform numerous imaging techniques that are either not possible with current technology, or are possible with current technology but would require far more optical components, far more expense, far more computation, and/or far more power consumption.

This invention can demonstrate several never-seen-before capabilities. For instance, live structured-light video of very bright scenes can be captured, even, for example, a light bulb that is on. The invention can also capture epipolar-only and indirect-only live video with optimal energy efficiency. The invention can measure the 3D shape of objects in challenging conditions, such as strong indirect light, strong ambient light, and smoke while using a low-power projector as the light source. Also, the invention can record live video from the point of view of a projector, rather than a photo-sensor.

In one embodiment, a one-dimensional sensor fitted with a wide-angle lens is used to provide a wide-angle field-of-view without distortion. The sensor is configured to read a one-dimensional line of pixels from the center of the field-of-view of the lens.

BRIEF DESCRIPTION OF THE DRAWINGS

FIG. 2 illustrates the extremes of projector technologies. FIG. 2($a$) is a representation of the low end of the efficiency spectrum, where the light source is always on, blocked with mask p. FIG. 2($b$) represents the most efficient projector, able to concentrate all the energy of the light source to just one pixel.

FIG. 4($a$) shows the epipolar component of an image of an object, while FIG. 4($b$) shows the non-epipolar component of an image of the same object.

FIG. 10(A-C) show perspective, top, and side views of the spherical sensing unit respectively.

DETAILED DESCRIPTION OF THE INVENTION

A widely known truth in the field of image capture is that to optimally capture images with the most detail and least noise, the light throughput between the light source and the photosensor must be optimized. This invention implements this maxim while at the same time allowing for selective blocking of light paths between the light source and photo-sensor. The system topology that results from this optimization also allows for never-seen-before imaging techniques and energy efficiency.

Figure 1:
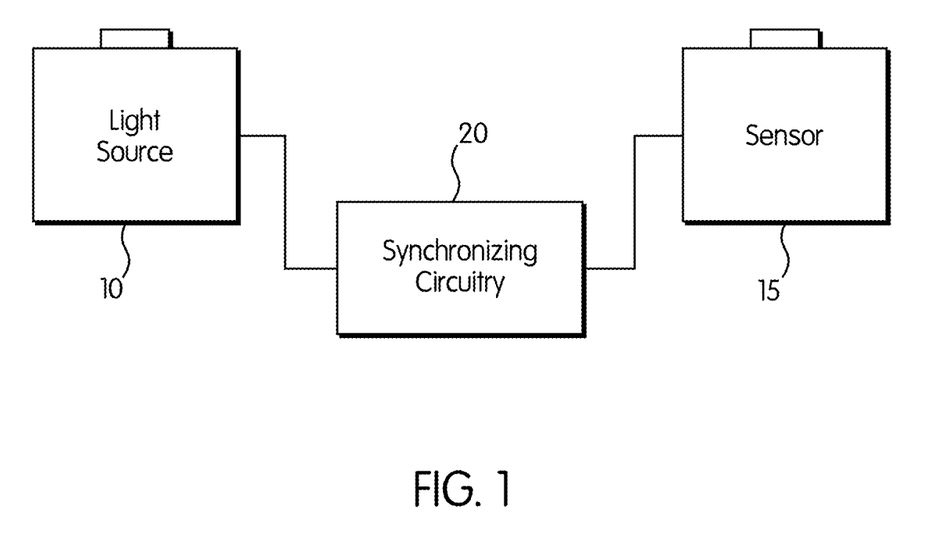
FIG. 1 shows a functional block diagram of the imaging system.

There are three main parts to the invention as currently implemented, interconnected as shown in FIG. 1: a directable light source 10, a sensor 15 and, crucial to this invention, a synchronizing controller 20 that synchronizes the active region of sensor 15 to the beam direction of light source 10 in accordance with an optimizing equation, discussed below.

As used herein, the term "directable light source" is a controllable light source that emits different amounts of light in different directions, where each pixel in the projector corresponds to a direction along which a slightly diverging beam is emitted. By changing the amount of light emitted along each direction, the projected pattern can be changed. There are two broad classes of projectors, spatial light modulator (SLM) based projectors and scanning projectors.

Figure 2A:
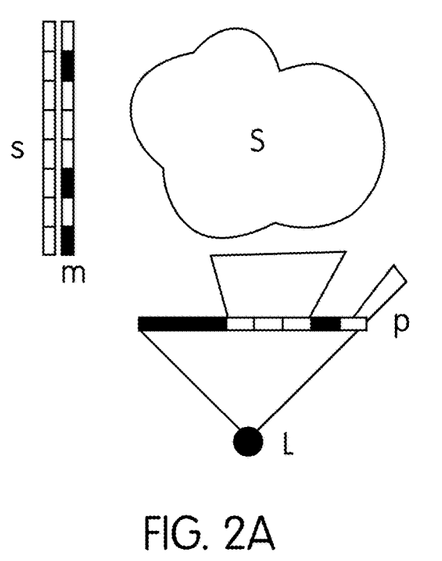

SLM projectors are of the type shown in FIG. 2($a$), and consists of a 2D array of controllable elements, one element for each pixel. Depending on the type of SLM, the elements can be controlled to either block/reflect light (a digital micro-mirror device (DMD)) or block/transmit light (liquid crystal display (LCD) or liquid crystal on silicon (LCoS)). The projector has a light source inside along with optics to focus that light onto the entire field of the SLM. By controlling the SLM elements, one can change the spatial light pattern the projector sends out. In the equations shown herein, these projectors have σ=N, where N is the number of pixels. This type of projector is very inefficient when projecting patterns where only a small number of pixels are illuminated (a pattern containing a single line for instance) because most of the light needs to be blocked by the SLM to create the pattern.

Figure 2B:
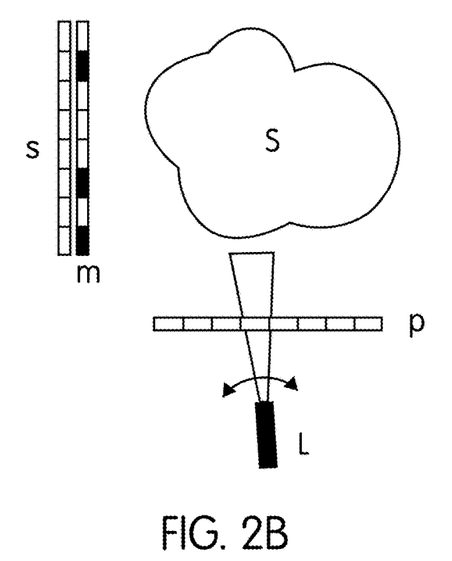

Scanning projectors are of the type shown in FIG. 2(b) and internally have a light source, some optics that focus the light into a narrow beam and a controllable mirror that deflects the beam. By rapidly changing the mirror deflection and simultaneously modulating the light power of the internal source, the projector is able to 'draw' a spatial pattern. With this type of projector only one direction (or pixel) is being illuminated at any point of time, but this direction changes very quickly. In the projector used in the preferred embodiment of the invention, the mirror deflects the beam along a rasterized path (i.e., scans across one row at a time and proceeds row-by-row). This is a raster scanning laser projector. In the equations shown herein, scanning projectors can be thought of as projectors with σ=1. This type of projector is efficient when projecting patterns where only a small number of pixels are illuminated.

As used herein, the terms "light source", "directable light source" and "projector" are used interchangeably.

Also, in the preferred embodiments of the invention, various types of sensors may be used. Phase measuring light sensors (example photonic mixing devices or PMDs) can be used for measuring distance based on continuous wave time-of-flight; Dynamic vision Sensors (DVS) are sensors that are sensitive to changes in light levels; and photodiode arrays and avalanche photodiode arrays are high speed, high sensitivity light sensors that are often used for impulse time-of-flight measurements (flash LIDARS). In addition, basic CMOS and CCD sensors may be used.

In the preferred embodiment of the invention, a scanning projector of the type using a LASER-based projector with a beam steering mechanism, for example, a MEMS mirror, is used as the directable light source, and the sensor is preferably a light sensitive photosensor with a rolling shutter.

With reference to FIG. 1, light source 10 can be controlled to illuminate a specific point, line, or area of a scene to be imaged. Sensor 15 contains a grid of light-sensitive pixels. In a preferred embodiment, the rolling shutter of the photosensor captures an image by rapidly scanning the scene one row (or column) of pixels at a time. By synchronizing these, at any point of time, the light can selectively illuminate just the part of the scene that will be scanned by the photo-sensor. This optimizes the energy required to image the scene. The goal of the invention is to maximize the total energy that can be transmitted from individual projector pixels to individual sensor pixels.

The mathematical framework for this energy-optimized imaging system follows. If light source 10 is always on, and emits at the constant rate of Φ watts, illuminating a scene for exposure time T means that the total energy generated by light source 10 is ΦT.

The illumination vector l is used to describe how the total energy of a projector is distributed over N individual pixels. In particular, each element of l measures the total energy emitted by the source through a specific projector pixel during the exposure time. The $l_1$-norm of l is therefore equal to the total "useful" energy of the source, i.e., the energy actually used for scene illumination. This energy cannot be larger than the energy generated by the source:

$$0 \leq l, \|l\|_1 \leq \Phi T$$

where $\|\ \|_1$ is the $l_1$-norm, giving the sum of all elements of a vector.

The energy efficiency of a projector depends critically on its ability to direct a maximum amount of the energy generated by the light source 10 to individual pixels. This ability is expressed as an upper bound on the individual elements of l:

$$\|l\|_\infty \leq \Phi T/\sigma$$

where σ is a projector-specific parameter defined as the spatial spread. This parameter takes values between 1 and N and models energy redistribution. The larger its value, the lower the energy that can be sent through any one pixel, and the more energy wasted when projecting a pattern with just few pixels turned on.

The specific value of σ depends on the projection technology. At the far end of the range, with σ=N, are conventional projectors, as shown in FIG. 2(a). These projectors use mirrors and lenses to distribute light evenly over a spatial light modulator, which may then block all or part of the light. The near end of the range, with σ=1, represents an idealized projector that is perfectly efficient, as shown in FIG. 2(b). This projector can send all its light through just one pixel for the entire exposure time T but can also distribute it, without any blocking, according to an arbitrary illumination l.

The $l_1$ and constraints on l can be written more concisely as $$0 \leq l, \ \|l\|_{\dagger\sigma} = \max\left(\frac{\sigma\|l\|_\infty}{\Phi}, \frac{\|l\|_1}{\Phi}\right) \leq T$$

where $\|\cdot\|_{\dagger\sigma}$ is the max of two norms and therefore also a norm. These constraints are useful in three ways. First, arrangements can be optimized with very different light redistribution properties by adjusting the spatial spread parameter. Second, the dependence on exposure time makes a distinction between systems that conserve energy and those that merely conserve power. Third, they explicitly account for timescale-dependent behavior, for example raster-scan laser projectors can act like a beam, light sheet, or point source depending on T.

For masks that can control light attenuation at individual pixels on a sensor, we consider mask m, which is bounded from 0 to 1. The combined effect of the mask and illumination pattern can be represented as the outer product matrix of two vectors:

$$\Pi = ml^T$$

Intuitively, matrix Π can be thought of as defining a non-uniform spatial light distribution that concentrates energy usable for imaging in some parts of space and not in others. Energy utilization is maximized when both the illumination pattern and the mask reach their norm upper bounds, $\|m\|_\infty \|l\|_{\dagger\sigma}$.

It is also possible to use more than one mask and illumination pattern for the frame exposure time. Suppose for instance that K masks and illuminations were used. The optimization equation could then be written as:

$$\Pi = [\underbrace{m_1 \ m_2 \ \cdots \ m_K}_{\text{masks } M}][\underbrace{l_1 \ l_2 \ \cdots \ l_K}_{\text{illuminations } L}]^T$$

There may be sequences that distribute light exactly like M and L but with greater total energy. Finding the most energy-efficient sequences requires solving a homogeneous factorization problem, where the goal is to produce a matrix Π with the largest possible scale factor:

$$\max_{\gamma, M, L, t_1, \ldots, t_K} \gamma$$

$$\text{subject to} \quad \gamma \Pi = ML^T$$

$$0 \leq m_k, \ \|m_k\|_\infty \leq 1$$

$$0 \leq l_k, \ \|l_k\|_{\dagger\sigma} \leq t_k$$

$$0 \leq t_k, \ \sum_{k=1}^{K} t_k \leq T$$

The optimization equations above are hard to solve directly. But the equation can be relaxed into the following form:

$$\min_{M, L} \|\Pi - ML^T\|_F^2 + \lambda \sum_{k=1}^{K} \|m_k\|_\infty \|l_k\|_{\dagger\sigma}$$

$$\text{subject to} \quad 0 \leq m_k, \ 0 \leq l_k$$

where λ is a regularization parameter that balances energy efficiency and the reproduction of Π. This allows for finding M & L that will saturate their upper-bound constraints, and hence a fully illuminated matrix Π.

Figure 3:
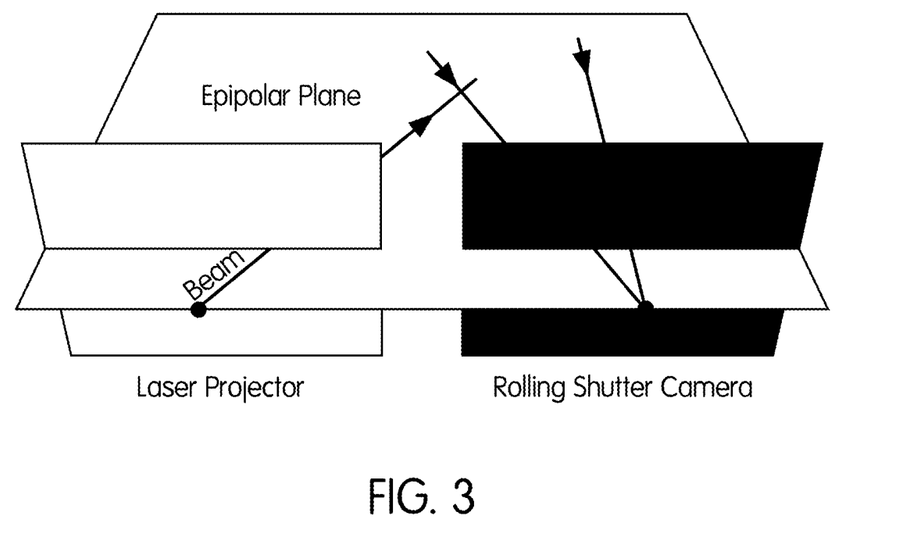
FIG. 3 illustrates the preferred embodiment of the invention wherein a light source and a sensor are arranged in a rectified stereo configuration.
Figure 4A:
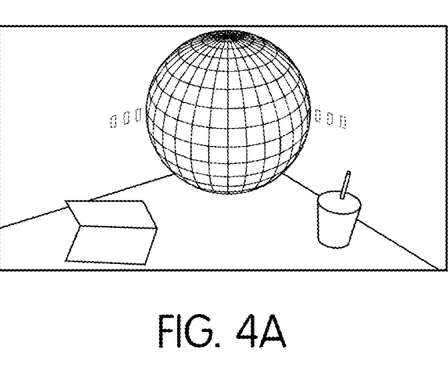
Figure 4B:
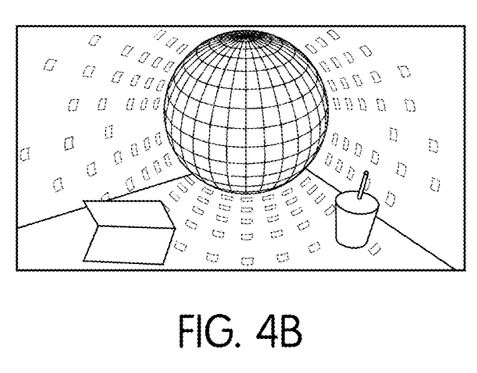

Illumination codes that maximize the energy efficiency are the impulse illuminations, like those of FIG. 2(b). This is replicated in the invention using the LASER-based projector, preferably an ultra-low power LASER, with a MEMS mirror to provide beam steering as depicted in FIG. 1 as light source 10. In this embodiment, the light source and the sensor must be configured using a rectified stereo configuration, as shown in FIG. 3. To capture the epipolar component, as shown in FIG. 4(a), the sensor masks are ideally chosen such that for each projector scan line, only the corresponding row in the sensor is exposed. In reality, a single illuminated line in the projector may be mapped to multiple lines in the sensor. This blocks all light that does not satisfy the constraint between the projector and sensor. The masks can be implemented easily using the rolling shutter setup by placing the projector and sensor in an approximate stereo configuration such that their optical axes are parallel to each other, perpendicular to the baseline and the scanlines of the projector and rows of the sensor are parallel to the baseline. In this configuration, the epipolar lines between the projector and sensor are horizontal lines. For any projector scanline the row of pixels in the sensor image along which the corresponding points must lie can be identified.

To capture the epipolar component, the exposure $t_e$ for each sensor row is matched to the time the projector stays on a scanline ($t_p$) and the other timing parameters are chosen so that the line scanned by the projector is synchronized to the row being exposed in the sensor. Conversely, to capture non-epipolar light, the sensor exposure time is set to be $t_p$ less than the projector cycle time and the trigger is offset by $t_p$ so that every row is exposed for the entire projector cycle except during the time it is illuminated directly by the projector.

This energy optimized imaging system also has unique capabilities that are not possible in other imaging systems.

Because the rolling shutter of sensor 15 is tuned by synchronization controller 20 for the impulse illuminations of light source 10, very little ambient light is let into the sensor. This allows the invention to image extremely bright objects and scenes under bright ambient illumination. With current technology imaging systems, light from a controlled light source would be overwhelmed by ambient light and would not be detectable at the photosensor.

Also, since the rolling shutter of sensor 15 is aligned solely to the light source 10, reflections and scattered light that are caused by the object (such as if the object was mirrored, shiny, metallic, translucent, etc.) are not captured in the frame. Note that the rolling shutter of sensor 15 can purposely be offset from the source illumination so that only the reflections are captured.

This ability to not image reflections, scattered light and ambient light also gives the invention the ability to image and recover the shape of objects that are in challenging lighting conditions, specifically smoke or mist filled surroundings. Using the source illumination-to-photo-sensor disparity offset can allow for three-dimensional reconstruction within such lighting challenged areas.

It should be understood by one of skill in the art that controller 20 could be implemented as circuitry, as an ASIC, as a microprocessor running software, or by any other means known in the art. The invention is not intended to be limited to one method of implementing the functions of the controller.

Dual photography, a technique where the image generated is from the viewpoint of the light source rather than the photosensor, is also possible, even in a live video context, with no processing required.

The illumination technique used in this invention can be expanded to multiple photosensors. This allows for highly power efficient active illumination stereo using two or more photosensors.

The technique also extends naturally to configurations with multiple light sources. Different light sources interfere with each other minimally when used with the proposed technique. With inter-source synchronization, interference can be eliminated completely.

The proposed technique can be realized with a time-of-flight (ToF) photosensor. A rolling shutter ToF photosensor combined with a modulated scanning laser light source using our technique would allow for a power efficient ToF depth sensor that works under bright ambient light conditions and suppresses indirect lighting effects.

In other embodiments, the invention can be used with other imaging modalities including, but not limited to, light field imaging, microscopy, polarization, coherent, nonlinear, fluorescent and non-linear imaging.

Although the invention is illustrated and described herein with reference to specific embodiments, the invention is not intended to be limited to the details shown. Rather, various modifications may be made in the implementation without departing from the invention.

In a second embodiment of the invention, wider angle fields-of-view (i.e., 120+ degrees) can be realized by using a one-dimensional sensor with a wide-angle lens attached thereto to cover one dimension. Attaching a wide-angle lens to the two-dimensional sensor described with reference to the preferred embodiment would introduce distortion, making epipolar imaging impossible for rows of the two-dimensional sensing array not located near the center of the lens. Ideally, the center of the circular lens is aligned with the center of the one-dimensional sensor. As such, lines in the 2D rectangular imager that are further away from the center experience more distortion The use of the one-dimensional sensor with the wide-angle lens allows a wide field-of-view in that dimension. Physically moving the camera through another dimension allows capturing of any defined 2D field-of-view. As an example, using the one-dimensional sensor and introducing movement (i.e., spinning or scanning) of the unit in a plane orthogonal to the single dimension imaged by the one-dimensional sensor allows achieving a 360 by 120+ degree field-of-view. A pair of one-dimensional sensors arranged in a stereo configuration can be used to capture depth data within this field-of-view.

The one-dimensional sensor may be, for example, a true one-dimensional or a linear sensor having multiple rows of pixels wherein only one row of the pixels is relevant for purposes described herein. Alternatively, a two-dimensional sensor of the type described with respect to the preferred embodiment may be used if only one line of pixels in the center of the field-of-view is used to image. Any configuration in which only one row of pixels is captured would work for this embodiment. For example, a one-dimensional "linescan" sensors may be used. In practice, such sensors have more than one line, but it is typically a very low number (<10). Some advanced linescan imagers use many rows (~30) to increase image quality, but the output is only ever 1 or 2 rows of an image. All such embodiments are meant to be included in the definition of a "one-dimensional sensor"

The sensors may be fitted with a wide-angle lens, preferably, a lens having a field-of-view of 120° or greater and, optionally, a bandpass filter, for example, an infrared bandpass filter.

For illumination, one or more lasers may be used. For example, to cover a 120° field-of-view, two lasers having lines projecting through a custom diffractive optical element (DOE), which turns a single laser beam into a 1D line of dots may be used, each laser covering a 60° portion of the 120° field-of-view.

Figure 5:
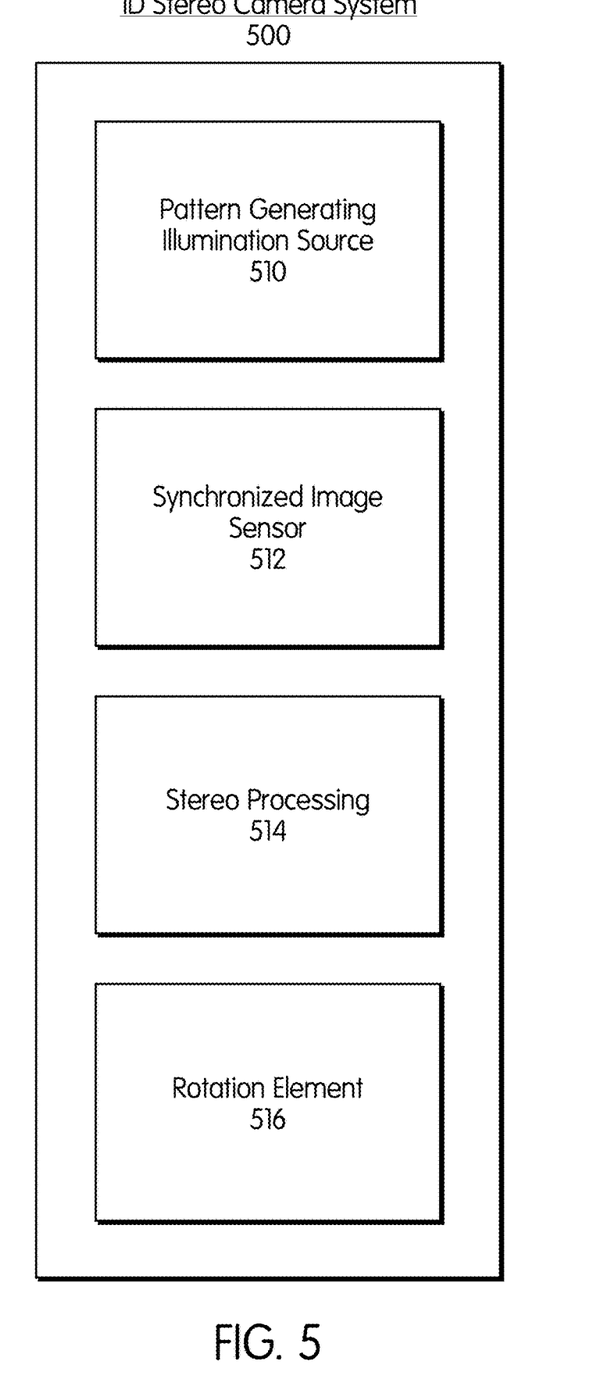
FIG. 5 shows a block diagram of the spherical imaging system.

FIG. 5 is a block diagram of a system 500 for capturing RGBD data as a near-spherical image utilizing the 1D sensor described above. The system includes a pattern generating illumination source 510, which may be, in one embodiment, an IR laser that is projected through a DOE to produce a one-dimensional pattern. In alternate embodiments, pattern generating illumination source 510 could be an IR LED or projector. The generation of a pattern is useful, for example, for providing a pattern on flat, otherwise featureless surfaces, which improves the performance of the system, allowing for increased performance of stereo calculations.

Synchronized image sensor 512, in a preferred embodiment, is a 1D or 2D image sensor. In the case of a 2D sensor, the projection is raster scanned, so the line capture within the image sensor needs to be synchronized to the projection. In the case of a 1D sensor, the synchronization is trivial and performed through mechanical alignment. The sensors are used to capture a single line of pixels as the unit is rotated about an axis. The frequency with which the sensors are read and the rate at which the platform is rotated can be varied for the application. For example, platform 802 can be spun slower and the camera triggered more often to produce a higher resolution image. In preferred embodiments, platform 802 moves continuously, and the illumination source 510 is pulsed on when the image is being captured. The alignment is mechanical due to the geometry of the mounting components used for the lasers and imaging lenses.

Stereo processing component 514 processes the data received from synchronized image sensor 512. An algorithm capable of taking 2 images (1D or 2D) and calculating a depth map based on disparity between the two images is used. Preferably, the system can produce a point cloud that is five megapixels in size for each scan that is taken.

Rotation element 516 consists of a spinning platform 1002 with a motor, as well as a controller necessary to control the speed of rotation of the spinning platform. In the preferred embodiment (1D case), the cameras are rotated to produce a 2D image. In alternate embodiments, the camera could be translated linearly to capture a 2D image.

Figure 6:
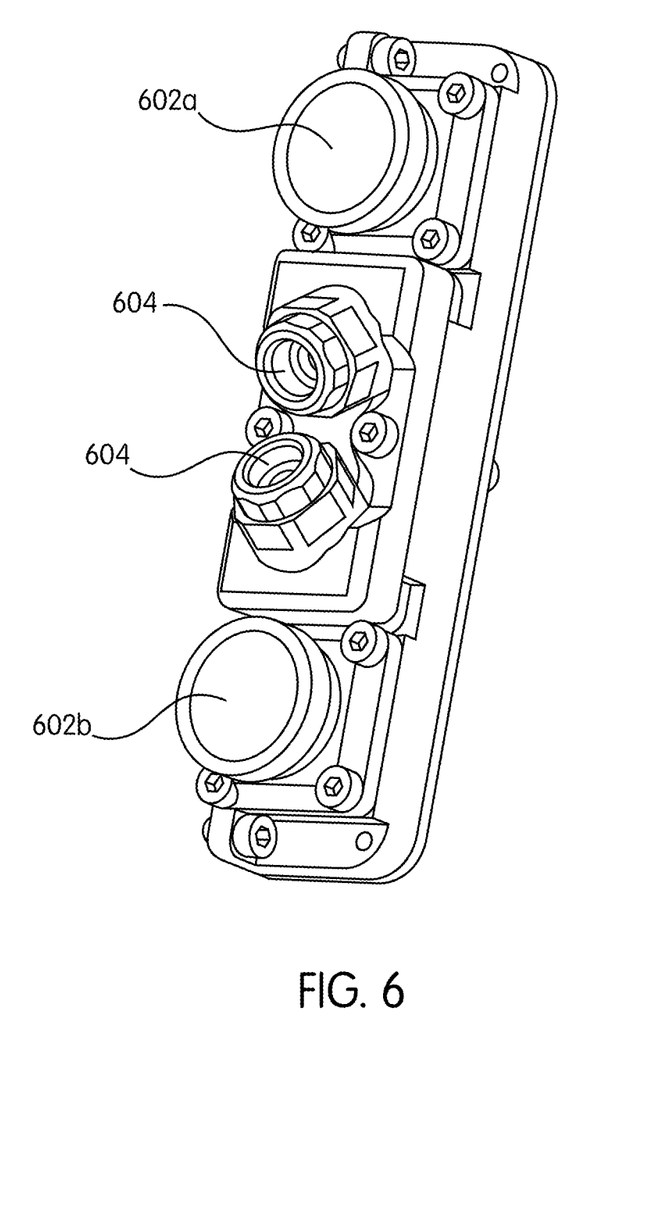
FIG. 6 shows a perspective view of a single sensing unit of the imaging system of FIG. 5

FIG. 6 shows a sensing unit 600 for providing depth information using stereo one-dimensional sensors in the configuration shown. Sensing unit 600 consists primarily of two one-dimensional sensors fitted with wide-angle lenses 602a and 602b respectively, effectively covering a 120° field-of-view. The field-of-view is illuminated by two lasers 604a and 604b each covering approximately 60° of the 120° field-of-view. Alternatively, to capture depth information, a single time-of-flight (ToF) sensor may be used in lieu of the stereo sensors, depending upon the application. For example, a TOF sensor may be utilized for longer distance sensing while stereo sensors, as shown in FIG. 6, may be used for closer distance scanning.

Figure 7:
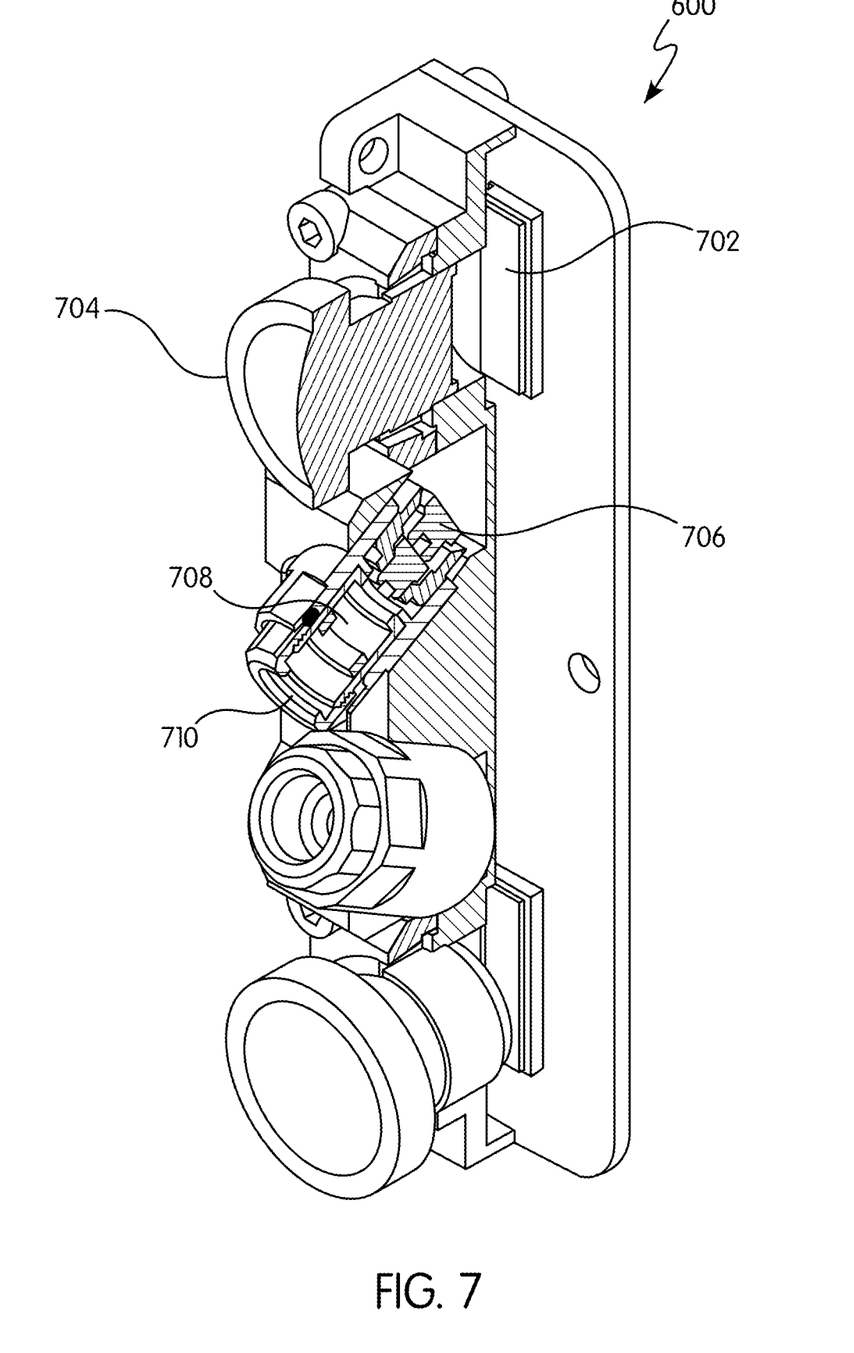
FIG. 7 shows a partial cross-sectional view of the sensing unit of FIG. 6

FIG. 7 shows a partial cross-sectional view the sensing unit 600, as shown in FIG. 6. Image sensor 702 may be fitted with wide-angle lens 704, providing a 120° or greater field-of-view and an infrared bandpass filter. The source of the laser illumination may be provided by a laser diode 706 which may be, for example, an 808 nm IR laser diode. Note that the wavelength of the diode may be selected based upon the desired application. For example, for an application where having the laser illumination be invisible, it may be desirable to use infrared or near-infrared illumination, while an application for use underwater may use, for example, a laser diode having a wavelength in the blue range of the spectrum. The laser produced by laser diode 706 may pass through a plastic collimating lens 708 and through a custom diffraction grating 710 which breaks the laser beam into a one-dimensional line of dots and spreads the beam over 60 degrees. The 60 degrees spread is a physical limitation of the DOE to bend the light.

Figure 8A:
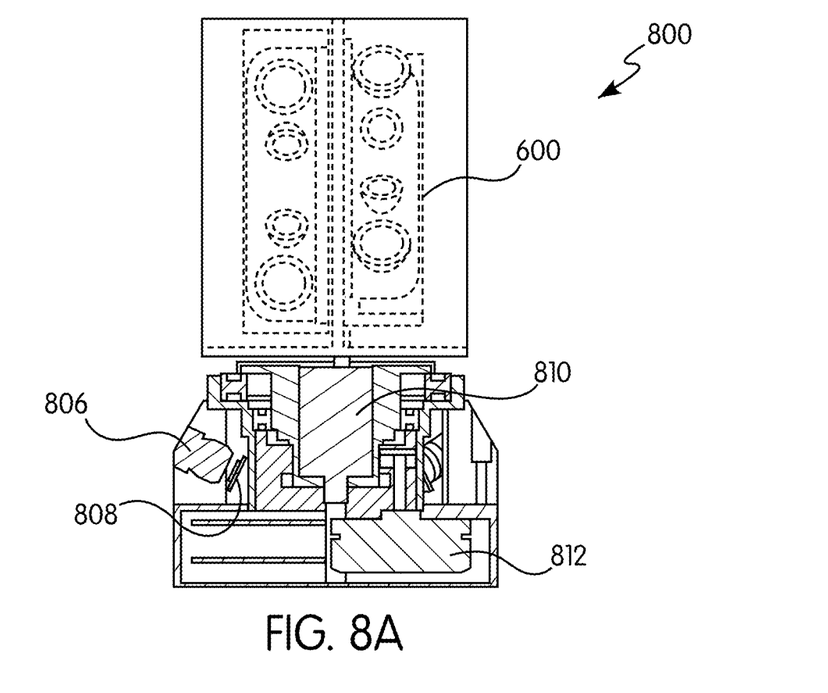
FIG. 8(A) shows a cross-sectional view of the spherical imaging system.
Figure 8B:
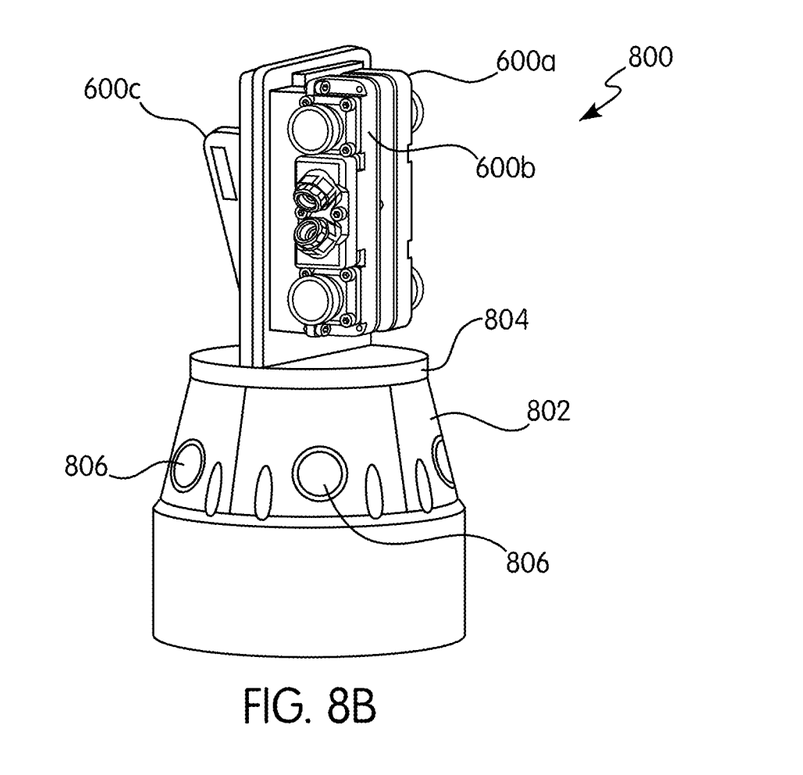
FIG. 8(B) shows a perspective view of the spherical imaging system with the covering of the top portion removed.

An application of sensing unit 600 is shown in FIGS. 8(A) and 8(B). Spherical sensor 800, in this embodiment, is provided with three sensing units 600a, 600b and 600c, as shown in FIG. 8(B). Two of the sensing units 600a, 600b are configured in a back-to-back configuration, and will cover the same field-of-view as the rotating platform 804 is spun with respect to stationary base 802. The use of two sensing units 600, 600b in this configuration allows a doubling of the frame rate within the 120° field-of-view covered by both sensing units.

Figure 9:
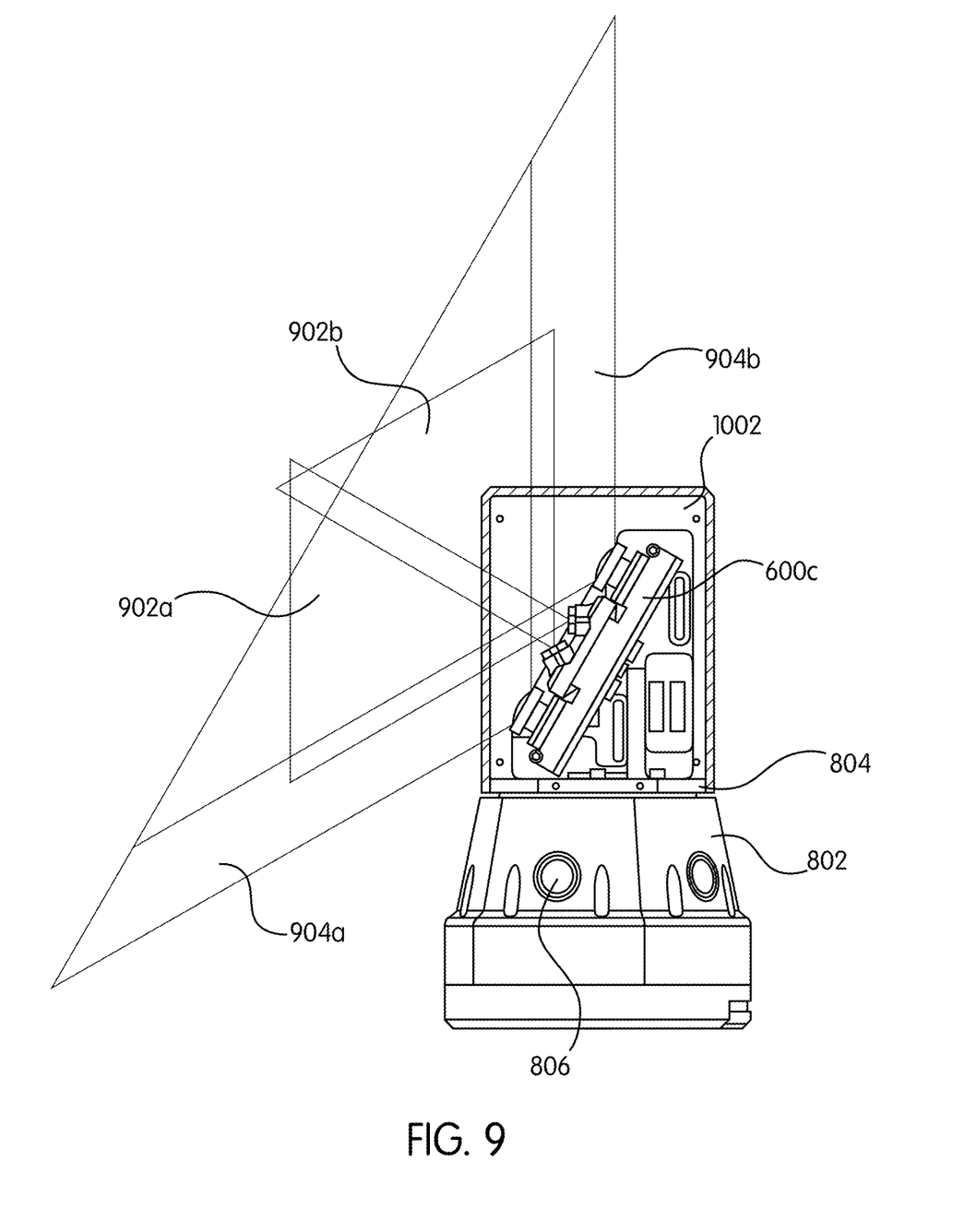
FIG. 9 shows the fields of view of the top sensing unit

A third sensing unit 600c is configured to cover a 120° field-of-view above spherical sensor 800, and, as such, the third sensing unit 600c is tilted with respect to the other two sensing units 600a, 600b to cover a field-of-view extending from above spherical sensor 800 and overlapping the fields-of-view of sensing units 600a, 600b. FIG. 9 shows the fields of view of the upper camera, with 902a and 902b showing the areas illuminated by the lasers and 904a and 904b show the fields-of-view of the stereo cameras.

Spinning platform 804 is spun with motor 812 shown in cross-sectional view in FIG. 8(A). Control signals sent to and imaging data read from spinning platform 804 may be communicated through slip ring 810. Alternatively, other methods of sending control signals and retrieving data from spinning platform 804 may be used, for example, a wireless connection.

In one embodiment, spherical sensor 800 may be configured with multiple RGB cameras 806, as shown in both FIGS. 8(A) and 8(B), which may provide RGB data in a full 360° field-of-view, without spinning. The RGB data may be combined with the depth data to produce a 360° RGBD image.

Figure 10A:
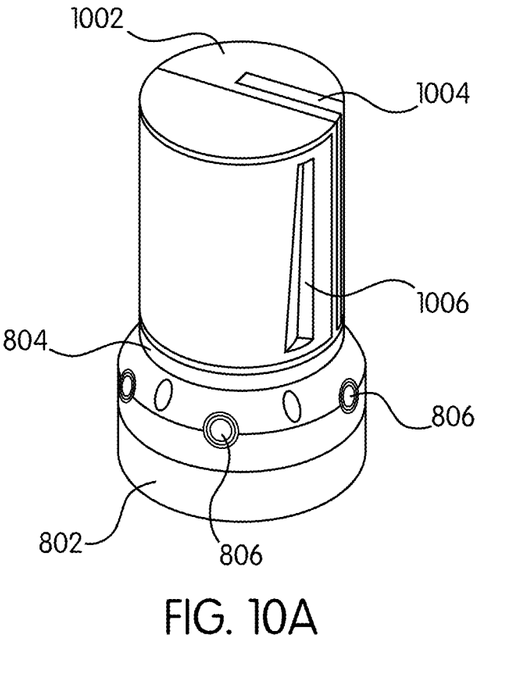
Figure 10B:
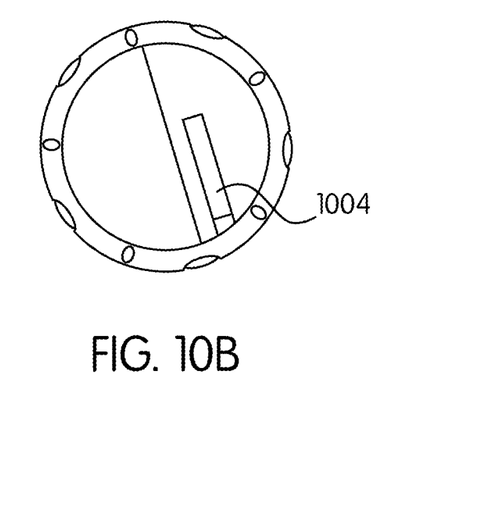
Figure 10C:
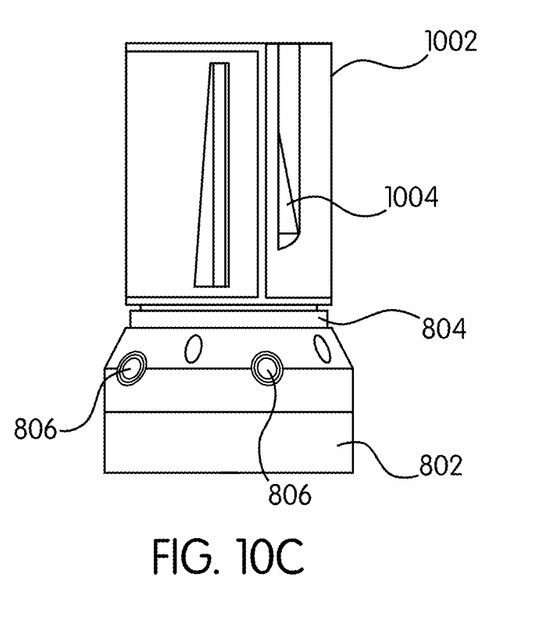

FIG. 10 shows the housing of unit 800. Spinning flat platform 804 may be enclosed by covering 1002. Covering 1002 may be configured with slots 1004 for the sensing unit 600c configured to capture the 120° field-of-view above spherical sensor 800. Slot 1006 allows one of back-to-back sensing units 600a, 600b to capture the 120° field-of-view around the unit. A second slot, similar to 1006 (not shown) may disposed on the other side of cover 1002 for use by the second of back-to-back sensing units 600a, 600b.

Note that the embodiment described herein is only one example of the use of one-dimensional epipolar imaging in wide-angle applications. Many other embodiments are possible without deviating from the spirit of the invention. The scope of the invention should be construed in light of the claims which follow.

We claim:

1. A system for wide-angle imaging comprising:
   a sensor configured with a wide-angle lens;
   a light source, arranged in epipolar alignment with the sensor, the light source fitted with a diffractive optical element to create a line pattern;
   software, executed by a processor configured to:
      illuminate the light source such that the line pattern lies along an epipolar line from the light source to the sensor;
      map the illuminated line pattern to one or more rows of pixels in the sensor along the epipolar line;
      configure the sensor to read the one or more rows of pixels; and
      read the one or more rows of pixels along the epipolar line.

2. The system of claim 1 wherein the one or more lines of pixels read from the sensor are read from the center of the field of view of the sensor.

3. The system of claim 2 further comprising:
   two or more sensors arranged in a stereo configuration, each sensor configured to read one or more rows of pixels mapped to the illuminated epipolar line;
   wherein the software is further configured to calculate depth information from data collected from the two or more sensors.

4. The system of claim 3 wherein the diffractive optical element creates a dotted line pattern.

5. The system of claim 3 further comprising:
   a moveable platform having the two or more sensors and the light source mounted thereon;
   wherein the software is further configured to control the movement of the platform.

6. The system of claim 5 wherein the movement is a spinning movement about an axis parallel to the epipolar line illuminated by the light source.

7. The system of claim 3 wherein the light source is a laser diode.

8. The system of claim 7 wherein the laser diode emits light in the infrared or near-infrared, the system further comprising an infrared or near-infrared bandpass filter configured to each of the two or more sensors.

9. The system of claim 3 wherein the two or more sensors are time-of-flight sensors.

10. The system of claim 1 wherein the light source illuminates a line at least as wide as the field-of-view of the one or more sensors.

11. A system for obtaining a near-spherical point cloud of depth data comprising:
   two or more sensing units, each sensing unit comprising:
      a pair of sensors arranged in a stereo configuration, each sensor configured with a wide-angle lens having a field-of-view greater than 90 degrees;
      one or more lasers arranged in an epipolar alignment with the pair of sensors, each laser fitted with a diffractive optical element such that the lasers emit a single line of light; and
      a controller to:
         cycle the one or more lasers on and off to illuminate a line lying along an epipolar line from the one or more lasers to the pair of sensors;
         map the illuminated line to one or more rows of pixels in the two or more sensors along the epipolar line; and
         read data from the pair of sensors when the lasers are illuminated;
   a moveable platform having the two or more sensing units mounted thereon;
   a motor for moving the platform; and
   the controller for controlling the motor.

12. The system of claim 11 wherein the illuminated line covers a field-of-view at least as wide as the wide-angle lens fitted to each of the sensors.

13. The system of claim 11 wherein the at least two sensing units are arranged on the platform such that their combined field-of-view covers the maximum possible portion of a 180-degree field-of-view parallel to the line illuminated by the one or more lasers.

14. The system of claim 12 wherein the movement of the platform is a spinning motion about an axis parallel to the line illuminated by the one or more lasers.

15. The system of claim 11 further comprising:
   software, executed by a processor, the software configured to:
      read data from each of the at least two sensing units and calculate a point cloud of depth data for the field-of-view covered by the at least two sensing units.

16. The system of claim 11 comprising three sensing units, wherein two of the sensing units are arranged in a back-to-back configuration with a field-of-view complementary to the third sensing unit.

17. The system of claim 11 further comprising a stationary base about which the moveable platform moves.

18. The system of claim 17 further comprising a plurality of sensors located in the base such that the combined fields-of-view of the plurality of cameras covers the full 360-degree field-of-view surrounding the base.

19. The system of claim 18 wherein the plurality of sensors in the base provide RBG data and further wherein the two or more sensing units on the moveable platform provide depth data.

20. The system of claim 1, the light source controlled by the software to sequentially illuminate different epipolar lines and wherein the sensor is configured to read one or more rows of pixels mapped to each illuminated epipolar line.

* * * * *